Patented Mar. 18, 1947

2,417,505

UNITED STATES PATENT OFFICE 2,417,505

METHOD OF PROCESSING WOOD FOR THE RAPID MATURATION OF WHISKEY AND OTHER ALCOHOLIC LIQUORS AND WINES

Ernst T. Krebs, San Francisco, Calif.

No Drawing. Application December 19, 1944, Serial No. 568,930

2 Claims. (Cl. 99—48)

This invention relates to a method of processing wood for the rapid maturation of whiskey and other alcoholic liquors and wines and especially to improvements in my Patent No. 2,347,783, issued May 2, 1944, entitled "Method of processing wood for the rapid maturation of whiskey and other alcoholic liquors and wines."

In the above patent I have disclosed the fact that oak wood contains spores of cryptogams and fungi which when activated into profuse growth, have the property of aging or maturing liquors and wines; that is, the product of the growth resulting from the activation of the spores and fungi brings about rapid maturation or aging of the liquors or wines and causes development of bouquet and flavor in a comparatively short time.

The cryptogamic spores when properly activated, bring about a profuse cryptogamic growth. The cryptogamic growth in turn secretes an enzyme complex which is rich in tannase and the growth itself is rich in aminosuccinamides. The tannase hydrolizes the tannins in the wood thereby forming other acids which have a structure different from the tannins, said acids forming their corresponding esters with the higher alcohols in the liquors and wines. Upon the addition of liquor or wine to the processed wood the aminosuccinamides are dissolved and finally dissociated into succinic and succinamic acids and amino groups, and at the same time causes oxidation. The succinic and succinamic acids as well as the amino groups, form their corresponding esters.

After the cryptogamic growth has been developed from its spores and tannase has been formed in a sufficient amount chemically to alter the structure of the tannins the fungi begin to develop. The fungi developed is penicillia of the yellow and green-blue variety and has been found beneficial both to the production of flavor and improvement in bouquet.

The method of processing the wood to promote the cryptogamic growth and the fungi known as penicillia of the yellow and green-blue variety may be described as follows:

In a tight compartment of moist air maintained at a temperature between 75° and 85° F. lightly toasted or untoasted thinly cut white oak chips or shavings or a mixture of the same are placed on a rack in a covered non-metallic container, after being thoroughly mixed with about a 5% to 10% by weight of fresh finely ground white acorn meal or other material containing growth hormones. Enough water or a solution of magnesium chloride of a strength of ¼% to 1% to make the wood quite moist but not dripping wet is applied and the contents are then allowed to germinate. While germinating some air is needed but not any excessive amount. In about seventy-two hours more or less the cryptogamic spores of the wood have developed into a profuse growth which has been classified mainly as rhizopus growth. About the fifth to the tenth day depending on the extent of rhizopus growth, the enzymes liberated thereby should have completely dissociated the tannins. The penicillia alone will now begin to develop as the aminosuccinamide has been found to be a favorable media for their rapid development and growth. In ten to twenty days depending upon the temperature, the penicillia should be fully developed and the processed wood is now ready for the addition of white whiskey, brandy or other alcoholic liquors or wines.

I have now discovered that if a given quantity of white oak chips or shavings is processed as heretofore described; that is, until the cryptogamic spores have developed a profuse cryptogamic growth and that if I then divide the processed wood into two equal batches which will for purpose of description be referred to as batches A and B and that if batch A is subjected to a higher temperature in a closed container fermentation will take place and that when fermentation reaches the stage where the batch becomes quite sour the acid content of the processed wood will be found to be very materially increased and that when the wood thus processed or activated is mixed with the alcohol to be aged the acids combine with the higher alcohols to form fragrant esters.

Batch B on the other hand is processed in the same manner as heretofore described and when the penicillia reaches a profuse growth a fruit mustard-like odor is developed, when the tannins are fully dissociated and the batch is ready for use.

The two batches A and B are now thoroughly mixed and then added to and mixed with the alcohol, whiskey or wine to be aged. In other words in place of allowing the entire original quantity of chips or shavings to reach the stage where the penicillia is fully developed I divide the batch into two batches A and B, processing batch B to develop the penicillia growth and processing batch A to increase its acid content and I then mix the two batches before adding to the whiskey or other alcoholic liquor to be aged.

The process carried out and described in more detail will be as follows:

A predetermined quantity of white oak, preferably bourbon oak either in the form of thin chips or shavings and an equal amount of the same wood which has been lightly toasted is mixed with acorn kernels ground to an impalpable powder. The untoasted and toasted wood together with the acorn kernels ground to powder are thoroughly mixed. To this is added a solution of 1 to 400 of magnesium chloride. The batch is thoroughly mixed and the amount of solution applied is just sufficient to give the proper moisture. The mixed batch is now placed in a suitable covered container preferably non-metallic and the mixture in the moistened state is allowed to germinate at a room temperature of from 75° to 85° F. for a period of from five to ten days. When this has occurred the cryptogamic spores will have developed into a prolific growth and the enzymes liberated thereby will have completely dissociated the tannins. The entire batch is now divided into two equal quantities which as heretofore stated will be referred to as batches A and B.

Batch B is returned to the original or another container and maintained under the same temperature for a period of from ten to twenty days. The fungi penicillia develops during this period as the aminosuccinamide present is a favorable media for their rapid development and growth. The penicillia developed are of the yellow and green-blue variety; they seem to be aerobic but are strongly facultative. When the growth is fully developed the processed wood is ready for mixing with batch A as will hereinafter be described.

Batch A after reaching the stage where the cryptogamic growth is fully developed is placed in a tightly closed container and maintained at a temperature of about 90° F. The batch at first develops a fragrant fruity odor and after a few days a pleasant sour odor predominates. The pulp undergoes fermentation during this period and when it has developed a decidedly acid reaction which usually takes place within ten to twenty days it is ready to be mixed with batch B and added to the white whiskey or other alcoholic liquor to be aged.

A simple test to determine when the acidity is fully developed will be as follows: Digest a small quantity of the processed wood in several times its volume of one-hundred proof alcohol for about twenty-four hours. To this solution add Benedict's solution in the amount of three or four volumes and when boiled it should not give a reaction for sugar.

The two batches are mixed together in equal quantities or other proportions as desired for different degrees of flavor. To the mixed batch is added water to well-moisten or cover the wood and it is allowed to macerate for twelve or more hours before adding the liquor to be aged and matured.

It requires from four to six ounces of each of A and B batches to mature or age one gallon of white whiskey or brandy and enough water or spirits are added as the case might be to bring it up to one-hundred proof. It is left to macerate in a closed container for twenty to thirty days and the contents are occasionally agitated. A few days before taking the whiskey off the wood a small amount of lightly toasted chips or shavings may be added to partly bring out the bourbon-like flavor. The matured or aged liquid may now be filtered and bottled.

It is desirable to have an adequate amount of processed wood in the liquid and yet not too great an excess as this might give an off flavor. To determine the optimum amount of wood or the extractives carried thereby the test for quercitrin is quite reliable. To 3 cc. of the one-hundred proof treated whiskey in a half inch tube add two drops of ferric chloride U. S. P. and after standing for at least twenty-four hours the color should be from a clear amber to a deep olive green without precipitate. If a precipitate occurs the wood or its extractives are in excess and the amount of wood employed should be reduced.

The water used to dissolve the magnesium chloride is preferably tap water that has been boiled. The acorn kernels employed may be fresh or they may have been preserved in alcohol until ready for use. If they have been preserved in alcohol they should be soaked in sterile water for several hours before being ground to an impalpable powder. It has been found that acorn kernels preserved in 95% ethyl alcohol or in 99% isopropyl alcohol for one year retain their growth stimulating properties.

Other woods may be used for the same purpose. An example is the glycyrrhizae, which is rich in cryptogamic spores, tannins and the fungi penicillia.

It may be quite correctly stated that the A wood develops principally the acids which combine with the higher alcohols to form the esters that give the flowery or fragrant bouquet and that the wood B develops the acids which form the esters that give the liquor its fruity aroma and flavor.

Hormones contained in the acorn are not the only valuable growth activating hormones which may be employed. Other growth promoting hormones obtained from seeds and grains may be used to activate the cryptogamic or rhizopus spores of the wood. Seeds and grains should be finely macerated or ground to bring these hormones in contact with the medium containing the spores or their watery extracts may be employed. Vegetable juices containing growth hormones such as asparagus juice, juices from sprouts of germinating seeds or synthetic hormones may be used alone or combined for the activation of rhizopus growth from the wood; however, the addition of fresh acorn meal greatly facilitates the development both of the rhizopus and the penicillia growth.

Having thus described my invention, what I claim and desire to secure by Letters Patent is:

1. A method of treating wood which contains cryptogamic spores, spores of the fungi penicillia and tannin so that it will produce in spirituous liquor in a relatively short time the same physical, chemical and biological phenomena as will occur over a period of years when spirituous liquor is treated with normal wood, comprising moistening the wood with a growth activating vegetable hormone, germinating the moistened wood until a prolific cryptogamic or rhizopus growth from its spores and rich in aminosuccinamides is developed and tannase produced during said germinating period has substantially dissociated tannins present in the wood, the so-treated wood being favorable to the growth of penicillia fungi, removing a portion of the wood, germinating the remaining wood to produce a prolific development of fungi penicillia, subjecting the removed wood to fermentation until a decidedly acid reaction is obtained, mixing the said wood with the wood containing the penicillia, and then mixing the mixed wood with a spirituous liquor to be aged.

2. In a method of treating oak wood for the purpose of aging spirituous liquors, said wood containing cryptogamic spores of the variety rhizopus, spores of the fungi penicillia and tannins and after the rhizopus spores have developed a prolific growth and the tannins have been substantially dissociated, the steps, which comprise, removing a portion of the wood and subjecting it in a substantially closed container to a temperature which will promote fermentation, continuing fermentation until a decided acid reaction is obtained, germinating the remaining wood in a container until the penicillia fungi develops a prolific growth, removing the wood from the respective containers and mixing them, and then mixing the mixed wood with a spirituous liquor to be aged.

ERNST T. KREBS.

REFERENCES CITED

The following references are of record in the file of this patent:

UNITED STATES PATENTS

| Number | Name | Date |
| --- | --- | --- |
| Re. 21,589 | Krebs | Oct. 1, 1940 |
| 2,119,234 | Krebs et al. | May 31, 1938 |
| 2,224,352 | Krebs et al. | Dec. 10, 1940 |
| 2,347,783 | Krebs | May 2, 1944 |